US009773232B1

(12) United States Patent
Grassadonia

(10) Patent No.: US 9,773,232 B1
(45) Date of Patent: *Sep. 26, 2017

(54) PAYMENT WITHOUT ACCOUNT CREATION

(71) Applicant: Square, Inc., San Francisco, CA (US)

(72) Inventor: Brian Grassadonia, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,918

(22) Filed: Feb. 10, 2015

Related U.S. Application Data

(60) Provisional application No. 62/039,831, filed on Aug. 20, 2014.

(51) Int. Cl.
*G06Q 40/00* (2012.01)
*G06Q 20/10* (2012.01)
*G06Q 20/32* (2012.01)

(52) U.S. Cl.
CPC ....... *G06Q 20/108* (2013.01); *G06Q 20/3223* (2013.01)

(58) Field of Classification Search
None
See application file for complete search history.

(56) References Cited

U.S. PATENT DOCUMENTS

| | | | |
|---|---|---|---|
| 7,089,208 B1 * | 8/2006 | Levchin | G06Q 20/02 705/35 |
| 8,762,272 B1 | 6/2014 | Cozens et al. | |
| 2007/0022019 A1 | 1/2007 | Sherwin et al. | |
| 2009/0164374 A1 | 6/2009 | Shastry | |
| 2010/0161377 A1 * | 6/2010 | Hines | G06Q 30/02 705/7.29 |
| 2011/0078260 A1 | 3/2011 | Rashad et al. | |
| 2012/0158744 A1 * | 6/2012 | Tseng | G06F 17/3053 707/748 |
| 2012/0239469 A1 | 9/2012 | Steinberg et al. | |
| 2013/0024506 A1 * | 1/2013 | Setton | G06Q 50/01 709/204 |

(Continued)

OTHER PUBLICATIONS

U.S. Appl. No. 14/618,934, of Grassadonia, B., filed Feb. 10, 2015.

(Continued)

*Primary Examiner* — Olabode Akintola
(74) *Attorney, Agent, or Firm* — Eric L. Sophir; Dentons US LLP

(57) ABSTRACT

Technology is disclosed for a convenient money transfer without requiring any account login and/or creation activities. The disclosed technology enables a sender to transfer a specified amount of currency to one or more recipients through a payment application. In response to a request from the sender, the technology provides a user interface to collect a numerical value corresponding to the specified amount of currency, accesses a list of contacts in a database of the sender's mobile device, and then provides the list of contacts to the sender. The technology enables the sender to manually select recipients from the provided list of contacts and can accordingly initiate a payment process based on statuses of selected recipients.

34 Claims, 14 Drawing Sheets

(56) References Cited

U.S. PATENT DOCUMENTS

2014/0279436 A1     9/2014   Dorsey et al.

OTHER PUBLICATIONS

U.S. Appl. No. 14/618,947, of Grassadonia, B., filed Feb. 10, 2015.
U.S. Appl. No. 14/728,888, of Grassadonia, B., filed Jun. 2, 2015.
Non-Final Office Action mailed Aug. 4, 2015, for U.S. Appl. No. 14/618,864, of Grassadonia, B., filed Feb. 10, 2015.
Non-Final Office Action mailed Aug. 4, 2015, for U.S. Appl. No. 14/618,934, of Grassadonia, B., filed Feb. 10, 2015.
Non-Final Office Action mailed Aug. 4, 2015, for U.S. Appl. No. 14/618,947, of Grassadonia, B., filed Feb. 10, 2015.
Non-Final Office Action mailed Aug. 4, 2015, for U.S. Appl. No. 14/728,888, of Grassadonia, B., filed Jun. 2, 2015.
Final Office Action mailed Nov. 24, 2015, for U.S. Appl. No. 14/728,888, of Grassadonia, B., filed Jun. 2, 2015.
Final Office Action mailed Jan. 5, 2016, for U.S. Appl. No. 14/618,947, of Grassadonia, B., filed Feb. 10, 2015.
Final Office Action mailed Jan. 6, 2016, for U.S. Appl. No. 14/618,934, of Grassadonia, B., filed Feb. 10, 2015.
Notice of Allowance mailed Nov. 2, 2016, for U.S. Appl. No. 14/618,947, of Grassadonia, B., filed Feb. 10, 2015.
Non-Final Office Action mailed Jan. 18, 2017, for U.S. Appl. No. 14/618,934, of Grassadonia, B., filed Feb. 10, 2015.
Non-Final Office Action mailed Jan. 18, 2017, for U.S. Appl. No. 14/728,888, of Grassadonia, B., filed Jun. 2, 2015.

\* cited by examiner

PAYMENT WITHOUT ACCOUNT CREATION

CROSS-REFERENCE TO RELATED APPLICATIONS

This application claims priority to Provisional Application No. 62/039,831, filed Aug. 20, 2014, which is incorporated by reference in its entirety.

BACKGROUND

Financial transactions happen frequently in daily life. There are various payment methods available for performing financial transactions. These payment methods include payment by cash, by bank transfers, by credit cards, or by payment services. Typical payment services usually require a payer (also, "sender") or a payee (also, "recipient") to create associated service accounts before utilizing their payment services. Creating service accounts can sometimes be troublesome or time-consuming for payers and payees. For example, when a group of people goes out for dinner, one person of the group can first pay for the dinner and then seek reimbursement from others of the group. Calculating fair shares among a group of people and collecting the same from them can be time-consuming and inconvenient.

BRIEF DESCRIPTION OF THE DRAWINGS

Embodiments of the disclosed technology will be described and explained through the use of the accompanying drawings.

Figure 1:
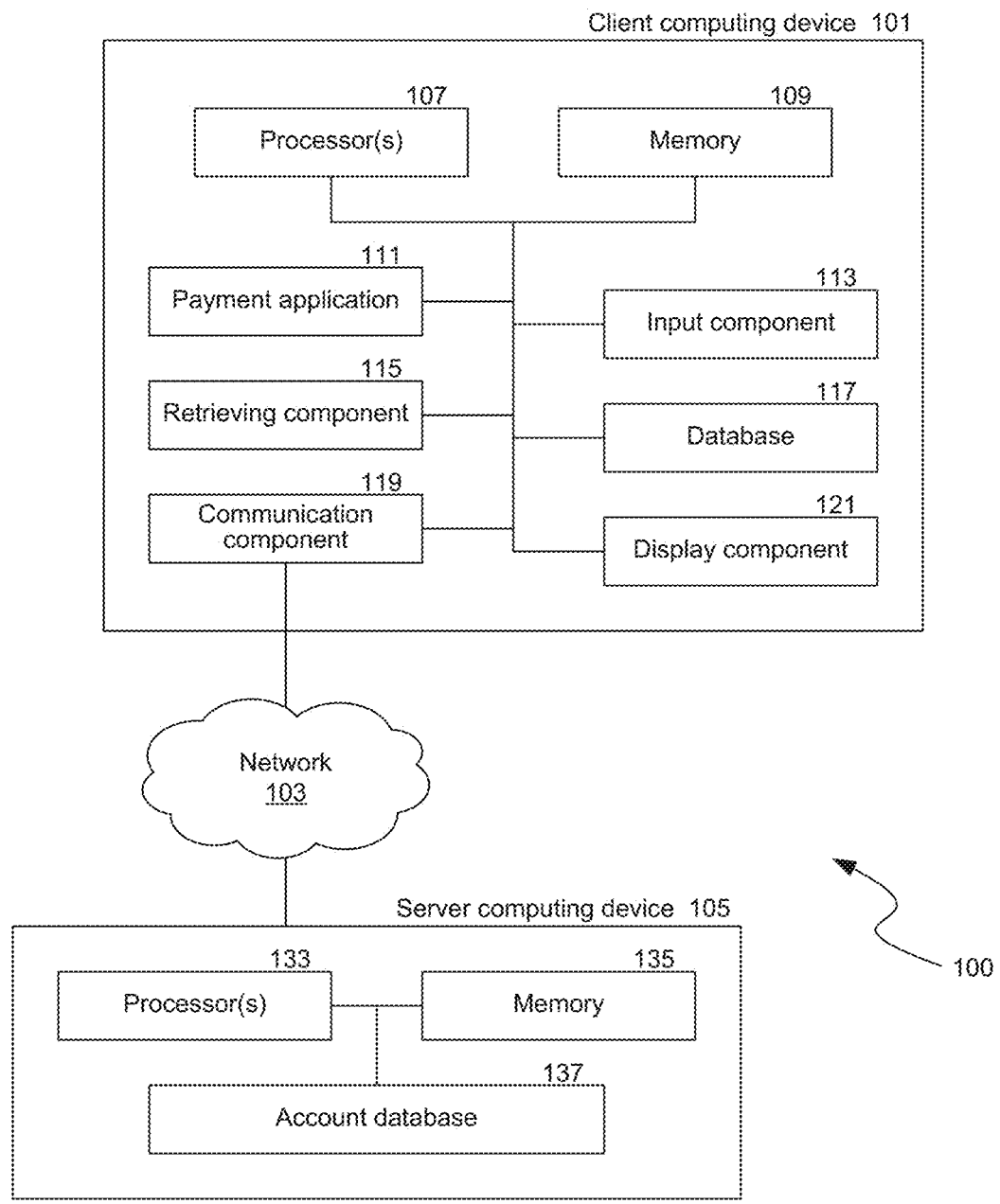
FIG. 1 is a schematic diagram illustrating a system in accordance with various embodiments of the disclosed technology.

The drawings are not necessarily been drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "an embodiment", "one embodiment," or the like, mean that the particular feature, function, structure or characteristic being described is included in at least one embodiment of the disclosed technology. Occurrences of such phrases in this description do not necessarily all refer to the same embodiment. In addition, the embodiments referred to also are not necessarily mutually exclusive.

A typical payment transfer through a third party payment service (e.g., a payment service website) generally requires some form of registration by both a sender and a recipient involved in a transaction before the payment transfer can occur. The registration generally includes an account creation process and a login verification process. In contrast, the disclosed technology provides a convenient way for a sender to execute financial transactions via the sender's mobile device without requiring any account login and/or creation activities.

More particularly, through a payment application installed in the sender's mobile device, the disclosed technology can receive a request from a sender to send an amount of currency (including currencies recognized by various countries and software-based currencies such as Bitcoin) or money. In response to the sender's request, the disclosed technology provides a user interface associated with the payment application and enables the sender to input a numerical value of the amount of currency to be sent. The payment application then accesses a list of contacts previously stored in a database of the sender's mobile device. The list of contacts can include personal information (e.g., email addresses, phone numbers, personal websites, companies, physical addresses etc.) of the sender's contacts (e.g., friends, colleagues, families, social acquaintances etc.). Then the payment application provides the list of contacts to the sender through the user interface. The disclosed technology enables the sender to manually select one or more intended recipients from the provided list of contacts by, for example, checking corresponding boxes (or other user interface elements) provided in the user interface or by other suitable means. Based on the sender's selection, the intended recipients can be identified. The payment application can then utilize information corresponding to the identified recipients from the list of contacts to further initiate a payment process to cause the specified amount of currency to be transferred to each of the identified recipients.

The disclosed technology then determines how to perform the payment process based on a status of each identified recipient. If the recipient has an existing service account associated with the payment application (e.g., having an existing account of a Payment Service Server (PSS) associated with the payment application), then the disclosed technology can perform the payment process by transmitting the specified amount of currency to the recipient based on information from the existing service account.

If the recipient has been engaged in a previous transaction associated with the payment application (e.g., has received a payment transfer through a payment service website or a PSS associated with the payment application), then the disclosed technology can perform the payment process by transmitting the specified amount of currency to the recipient based on information from the previous transaction.

In cases where the recipient neither has an existing service account associated with the payment application nor had any previous transactions associated with the payment application, the sender can still send money to the recipient through the disclosed technology. The disclosed technology enables a sender to send money to one or more recipients without knowing whether the one or more recipients have existing service accounts associated with the payment application.

The disclosed technology can perform the payment process by transmitting a linking invitation requesting the recipient to either submit financial account information or to create a new service account associated with the payment application (e.g., account creation process generally involves submitting financial account information).

In addition, the disclosed technology does not require a sender to have an existing service account associated with the payment application. As long as a sender has the payment application properly installed in his/her mobile device, the sender can easily send money to intended recipients by the payment processes discussed herein.

The disclosed technology provides an easy way for anyone having a payment application to send money to others by simply (1) entering an amount to be sent and (2) selecting a SEND button (e.g., provided by a user interface). The disclosed technology requires neither a sender nor a recipient to have an existing service account associated with the payment application. The disclosed technology provides the same user experience (e.g., a user interface remains similar or identical) to those who do not have existing service accounts associated with a payment application as those who do. Not having an existing service account does not prevent a user from utilizing the payment application and/or initiating a payment process.

In some embodiments, the disclosed technology enables a payment application to send an invitation (e.g., an email, a Short Message Service (SMS) message, or a Multimedia Message Service (MMS) message) to those involved in payment transactions associated with the payment application (e.g., either a sender or one or more recipients, referred to as the "invitees" below). The invitation can include a hyperlink requesting the invitees to link up (e.g., associate) their financial account information (e.g., a back account number, a credit card number, and/or a debit card number) with the payment application.

In some embodiments, the invitation can include a link to a secure location where the invitees can link up their financial account information with the payment application. In some embodiments, the invitees can provide their financial account information by simply replying to the invitation. For example, an invitee can simply enter his debit card numbers in a text message in response to a text message invitation. In another example, an invitee can simply put his or her account number in an email in response to an email invitation. In some embodiments, an invitation can include a token (e.g., an embedded security token) that can verify that the information received from an invitee is actually from a valid email address (or was linked from a valid email address) or a valid phone number.

The disclosed technology also provides a method for facilitating payment sharing through implementation of a payment application. The method allows a user of a client computing device (e.g., a smartphone) to send money to multiple recipients in a convenient way. More particularly, in response to a payment instruction from the user, the method can first retrieve a set of contact information (e.g., personal contacts including contact names, phone numbers, and/or email addresses) previously stored in a database of the client computing device. The method can then verify whether the contacts described in the retrieved contact information have existing service accounts in a server computing device (e.g., a web server that provides payment services or a PSS). For example, the method can verify whether the retrieved email addresses have been used as account names (e.g., login names) for creating new accounts in the server computing device.

In addition, the method can determine the number of potential recipients (e.g., payees) that are within the proximity of a client computing device. The method can analyze the retrieved contact information and obtain current locations of multiple electronic devices (e.g., smartphones) that correspond to the contacts from the retrieved contact information. For example, the retrieved contact information can include a phone number. The method can use that phone number to check or verify the current location of the electronic device having this particular phone number through, for example, a location service server (assuming that the phone number's owner authorized the location service server to disclose his or her current location). In other examples, the method can acquire location information based on a scanning process (e.g., by Bluetooth connection or other similar connections) that can determine whether the electronic devices that correspond to the retrieved contact information (e.g., potential recipients' smartphones) are within the proximity of the client computing device (e.g., sender's smartphone).

After collecting the account information and the location information, the method can generate an order for the contacts (or rank the contacts) in the retrieved contact information. The order can be used to determine how to provide (e.g., via a user interface shown on a display) the retrieved contact information to a user of the client computing device. For example, the method can first provide the contacts that seem to be in the proximity of the client computing device (e.g., the recipients and the user of the client computing device go to dinner together). In another example, the method can first provide those contacts that indicate an association with the payment application installed in the client computing device (e.g., the contacts having the same payment application installed).

In some embodiments, the method can first provide those contacts that seem to involve in a prior transaction with the user of the client computing device. Then the user, as a sender or payer, can quickly choose a proper recipient or payee from the provided information. In other examples, the method can first provide those contacts that seem to have existing accounts in a server computing device (e.g., a web server that provides payment services or a PSS) associated with the payment application previously installed in the user's client computing device. Then the user can quickly choose a proper recipient or payee and then pay the same.

The disclosed technology also provides a method of sending invitations for creating accounts in a server computing device (e.g., a web server that provides payment services or a PSS) from a client computing device (e.g., a user's smartphone). The method enables a user of the client computing device to input an invitation instruction. After receiving the invitation instruction, the method then retrieves a set of contact information from the client computing device. The method can then verify, for example, through communication with a server computing device, whether the retrieved contact information indicates that the user's contacts have existing service accounts in the server computing device (e.g., checking whether the retrieved email addresses in the retrieved contact information have been used to create new accounts in the server computing device). The method can generate a candidate list that includes the user's contacts that do not have existing accounts in the server computing device. The method can then enable the user to send an invitation (e.g., via email, Short Message Service (SMS), or Multimedia Message Service (MMS)) to the user's contacts in the candidate list, to ask them to create new accounts.

In some embodiments, the number of contacts that a single message can have can be limited to a predetermined or specified number (e.g., ten). The predetermined number can be determined based on availability of computing resources (e.g., connection bandwidth) or localities of the user and the invitation recipients (e.g., certain local regulations or rules may limit the number of recipients in one email).

The method also provides an incentive to a payment application user who sends invitations to his/her contacts. The incentive can be proportional to the number of invitations that the user has sent out (e.g. one dollar cash or credit per invitation) or calculated based on a specific function (e.g., an exponential function). Advantages of the prevent technology include enabling the payment application user to promote the payment application by sending invitations directly from the user, rather than from a server associated with the payment application. By doing so, the privacy of the invitation recipients can be adequately protected (e.g., the server won't be able to acquire personal information of the invitation recipients until they voluntarily disclose it to the server after receiving invitations).

One aspect of the disclosed technology includes enabling a user who is using an instant message application (e.g., WhatsApp, Snapchat, Viber, Line, WeChat, etc.) or a communication application (e.g., an email application) to easily send money to another user who is also using the same application. (Some of these messaging applications may be trademarks of their respective owners.) The disclosed technology enables a payment application to act as a backend or background process (e.g., a user would not notice or know that backend or background process during normal operation) associated with or incorporated in an instant message application, so as to provide the user with a "seamless" user experience (e.g., does not need to switch between the instant message application and the payment application; there is no interruption of an existing dialogue or chat). In some embodiments, a sematic analysis can be performed so as to determine whether a user really wants to pay the other user. In some embodiments, further user authorization can be required (e.g., to confirm with a user whether he or she really wants to pay the other user and/or verify a specified amount to be paid).

For example, when user A is chatting with user B on an instant message application associated with a payment application (as a backend/background application), user A can specify that he or she wants to pay user B a specified amount of money (e.g., user A can say: "I would like to pay you $100 for dinner yesterday," "Here is $10 I owe you," or "I am sending you $50"). Once a specified identifier (e.g., the dollar sign "$") is detected, the payment application can initiate a payment process. In some embodiments, the specified identifier can be a character, a string, a symbol, an embedded code, an insignia, etc. The payment process can start by, for example, searching user A's contact list for user B's contact information. Once found, the payment process can then proceed by: (1) verifying whether user B has an existing service account with the payment application; or (2) verifying whether user B has a previous transaction associated with the payment application. If either of the two verifications has a positive outcome, the payment application can continue to pay user B based on the information learned from the existing service account or the previous transaction (e.g., details can be found throughout this detailed description). If neither of the two verifications has a positive outcome, then the payment application can initiate an invitation process (e.g., details can be found throughout this detailed description) by sending out an invitation for requesting financial information and creating a new account associated with the payment application to user B.

FIG. 1 is a schematic diagram illustrating a system 100 in accordance with various embodiments of the disclosed technology. As shown in FIG. 1, the system 100 includes a client computing device 101 and a server computing device 105 coupled with the client computing device 101 via a network 103. In some embodiments, the network 103 can be the Internet. In other embodiments, the network 103 can be an intranet or the like. The client computing device 101 includes a processor 107, a memory 109, a payment application 111, an input component 113, a retrieving component 115, a database 117, a communication component 119, and a display component 121. The processor 107 is coupled to the memory 109 and configured to control the payment application 111, the input component 113, the retrieving component 115, the database 117, the communication component 119, and the display component 121. In some embodiments, the client computing device 101 can be a personal computer, a portable/mobile device, a smartphone, a personal digital assistant (PDA) device, or other electronic devices that are capable of communicating with the server computing device 105 via networks (e.g., the network 103). In some embodiments, the payment application 111 can be a set of instructions that can be downloaded, installed, and implemented by a computing device (e.g., the client computing device 101) so as to perform a payment process. The payment application can be executed under various operation systems such as Windows Phone, Android, iOS etc.

As shown in FIG. 1, the server computing device 105 can include a processor 133, a memory 135, and an account database 137. The processor 133 is coupled to the memory 135 and configured to control the account database 137. In some embodiments, the server computing device 105 can be a server computer, a super computer, a mainframe computer, or other suitable electronic devices that are capable of providing services (e.g., website service) through the network 103. The account database 137 is configured to store account information (e.g., login name and other related information) of the server computing device 105. In the illustrated embodiment, the server computing device 105 can be a PSS that provides payment services associated with the payment application 111.

The input component 113 can be configured to receive user inputs (e.g., requests for sending payments or invitation) for the client computing device 101. In some embodiments, the input component 113 can be a physical or virtual keyboard (e.g., can be provided on the display component 121), a touch screen, a mouse, a pointer, or other suitable devices.

The display component 121 can be configured to display a user interface for the client computing device 101. For example, the user interface can include a first region for displaying an amount to be transferred, and a second region for providing a virtual keyboard. In some embodiments, in response to a user request to transfer money, a user interface (e.g., a virtual keyboard shown on the display component 121) can be provided to a user for receiving a numerical value of an amount of currency to be transferred.

In response to a user request (e.g., a request to send money or an invitation) received from the input component 113, the retrieving component 115 can retrieve from the database 117 a set of contact information (e.g., a list of contact names with corresponding contact information). The contact information can include, for example, an email address, a phone number, a personal website, a company name, physical address etc.

In some embodiments, the payment application 111 can communicate with the server computing device 105 via the communication component 119. In some embodiments, after retrieving a set of contact information from the database 117, the payment application 111 can communicate with the server computing device 105 to verify whether each contact associated with the retrieved contact information has an existing service account in the server computing device 105. For example, a contact's email address can be used to verify whether it has been registered as a login name of the server computing device 105. After verification, the payment application 111 can provide a list of verified contacts to a user. The payment application 111 then enables the user to further manually select one or more recipients to send money or an invitation to create a new account in the server computing device 105 associated with the payment application 111. Based on the selected recipients, the payment application 111 can initiate a payment process (or an invitation process) based on statuses of the selected recipients.

In some embodiments, if the recipient has an existing service account associated with the payment application (e.g., an existing account in the server computing device 105), then the payment application 111 can perform the payment process by transmitting a specified amount of currency (e.g., input by the user as a sender) to the recipient based on information from the existing service account. For example, Recipient R has an existing service account in the server computing device 105. The payment application 111 can retrieve the financial information (e.g., a bank account) associated with Recipient R from the server computing device 105 and then performs the payment process by transmitting the specified amount of currency to Recipient R according to the retrieved financial information.

In some embodiments, if the recipient has been engaged in a previous transaction associated with the payment application (e.g., receiving a payment transfer through the server computing device 105), then the payment application 111 can perform the payment process by transmitting a specified amount of currency (e.g., input by the user as a sender) to the recipient based on information from the previous transaction. For example, Recipient R has provided his/her bank account information to the server computing device 105 and has received a money transfer from others through the server computing device 105. However, Recipient R did not have an account in the server computing device 105. The payment application 111 can retrieve (e.g., communicating with the server computing device 105 through the communication component 119) the bank account information provided by Recipient R from the server computing device 105, and then performs the payment process by transmitting the specified amount of currency to that bank account.

In embodiments where the recipient neither has an existing service account associated with the payment application nor had any previous transactions associated with the payment application 111, a user can still send money to a recipient through the payment application 111. The payment application 111 can perform a payment process by transmitting a linking invitation requesting the recipient to either submit financial account information or to create a new service account associated with the payment application 111 (e.g., submitting financial account information can be part of the account creation process). For example, Recipient R neither has an existing service account nor had any previous transactions associated with the payment application 111. Based on the information learned from the retrieved list of contacts (e.g., including Recipient R's email address or phone number) from the database 117, the payment application 111 can first send an email or an SMS message to Recipient R, with a hyperlink that is directed to the server computing device 105, requesting Recipient R to either provide financial information to complete the payment process or create a new service account in the server computing device 105. After receiving necessary financial information from Recipient R, the payment application 111 can complete the payment process by transmitting a specified amount of currency to Recipient R.

In some embodiments, a user does not need to have an existing account associated with the payment application 111 for sending money to a recipient. As long as the payment application 111 has been properly installed in the client computing device 101, the user can easily send money to intended recipients by the payment processes discussed herein.

Figure 2:
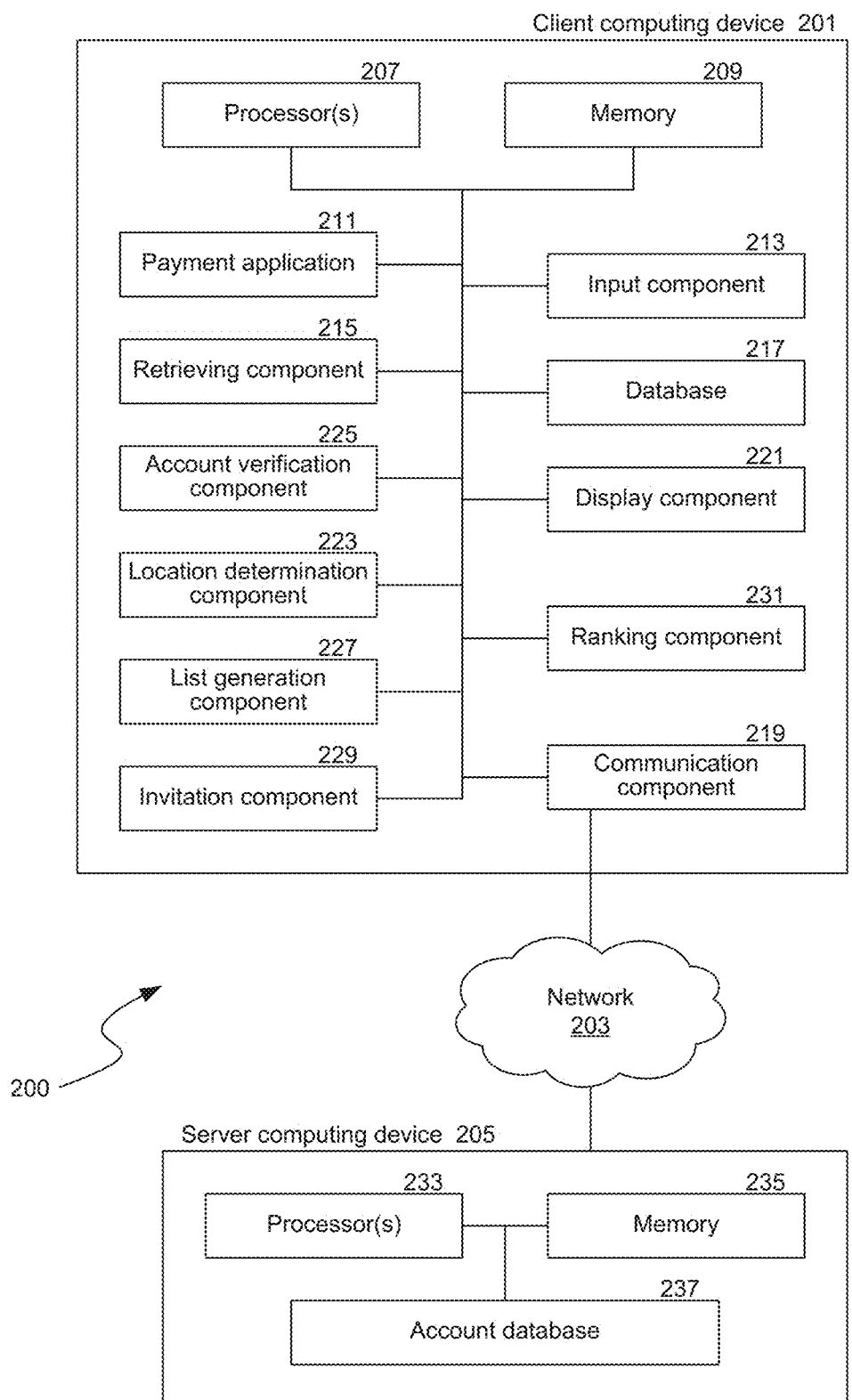
FIG. 2 is a schematic diagram illustrating a system in accordance with various embodiments of the disclosed technology.

FIG. 2 is a schematic diagram illustrating a system 200 in accordance with various embodiments of the disclosed technology. The system 200 can include a client computing device 201 and a server computing device 205 coupled with the client computing device 201 via a network 203. In some embodiments, the network 203 can be the Internet. In other embodiments, the network 103 can be an intranet or the like. The client computing device 201 includes a processor 207, a memory 209, a payment application 211, an input component 213, a retrieving component 215, a database 217, a communication component 219, a display component 221, a location determination component 223, an account verification component 225, a list generation component 227, an invitation component 229, and a ranking component 231. The processor 207 is coupled to the memory 209 and configured to control the payment application 211, the input component 213, the retrieving component 215, the database 217, the communication component 219, the display component 221, the location determination component 223, the account verification component 225, the list generation component 227, the invitation component 229, and the ranking component 231. The client computing device 201 can communicate with the server computing device 205 via the communication component 219.

In some embodiments, the client computing device 201 can be a personal computer, a portable/mobile device, a smartphone, a personal digital assistant (PDA) device, or other electronic devices that are capable of communicating with the server computing device 205 via networks (e.g., the network 203). In some embodiments, the payment application 211 can be a set of instructions that can be downloaded, installed, and implemented by a computing device (e.g., the client computing device 201) so as to perform a payment process (as discussed in embodiments in accordance with FIG. 1 above). The payment application 211 can be executed under various operation systems such as Windows Phone, Android, iOS etc.

As shown in FIG. 2, the server computing device 205 can include a processor 233, a memory 235, and an account database 237. The processor 233 is coupled to the memory 235 and configured to control the account database 237. In some embodiments, the server computing device 205 can be a server computer, a super computer, a mainframe computer, or other suitable electronic devices that are capable of providing services (e.g., website service) through the network 203. The account database 237 is configured to store account information (e.g., login name and other related information) of the server computing device 205. In the illustrated embodiment, the server computing device 205 can be a PSS that provides payment services associated with the payment application 211.

The input component 213 can be configured to receive user inputs (e.g., requests for sending payments or invitation) for the client computing device 201. In some embodiments, the input component 213 can be a physical or virtual keyboard (e.g., can be provided on the display component 221), a touch screen, a mouse, a pointer, or other suitable devices. The display component 221 can be configured to display a user interface for the client computing device 201.

In response to a user request (e.g., a request to send money or an invitation) received from the input component 213, the retrieving component 215 can retrieve from the database 217 a set of contact information (e.g., a list of contact names with corresponding contact information). The contact information can include, for example, an email address, a phone number, a personal website, a company name, physical address etc. After retrieving the set of contact information from the database 217, the account verification component 225 can communicate with the server computing device 205 to verify whether each contact associated with the retrieved contact information has an existing service account in the server computing device 205. For example, a contact person's email address can be used to verify whether it has been registered as a login name in the server computing device 205.

After verification, the list generation component 227 can generate a list of verified contacts and provide it to a user. In some embodiments, the list generation component 227 can remove some contacts from the list of retrieved contact information. For example, when a user request relates to sending an invitation to create a new account in the server computing device 205, the list generation component 227 can remove the contacts that have been associated with existing service accounts in the server computing device 205.

In some embodiments, the list generation component 227 enables a user to further manually select one or more recipients to send money or an invitation to create a new account in the server computing device 205. For example, the payment application 211 can provide corresponding check boxes for a user to select intended recipients of money or invitation.

In some embodiments, the list generation component 277 can facilitate the user's selection process by providing the verified list of contacts to the user based on an order (or ranking) determined by the ranking component 231. The ranking component 231 can rank and provide the list of contacts at least based on the following factors: (1) whether the contact has been previously associated with an existing account in the server computing device 205; (2) whether the contact has involved in a previous transaction associated with the server computing device 205; (3) whether the contact has been associated with (e.g., has installed) the payment application 211; (4) the contact's relationship with the user (e.g., a frequent contact); and (5) other suitable information learned from the retrieved contact information.

In some embodiments, current locations of multiple electronic devices that correspond to the retrieved list of contacts can be one of the factors to consider when ranking the list of contacts. The current locations of these electronic devices can be obtained from a location service server (not shown) or by interactions (e.g., a scan based on Bluetooth connection or other suitable techniques) between the client computing device 201 and these electronic devices. The location determination component 223 can determine whether these multiple electronic devices are within the proximity of the client computing device 201. In some embodiments, the contacts with corresponding electronic devices within the proximity of the client computing device 201 can be provided first in the list of contacts (e.g., this can mean that a contact and the user went to dinner together, and the user wants to pay the contact his share of the dinner expense).

The invitation component 229 can facilitate a user of the client computing device 201 to send an invitation of creating a new service accounts in the server computing device 205. In some embodiments, the user can be incentivized to do so. For example, an incentive to the user can include cash or credits proportional to the number of invitations that the user has sent out (e.g. one dollar per invitation). In other embodiments, the incentive to the user can be calculated based on a specific function (e.g., an exponential function).

The invitation component 229 enables a user of the client computing device 201 to input an invitation instruction via the input component 213. After receiving the invitation instruction, the invitation component 229 can request the retrieving component 215 to retrieve a set of contact information from the database 217. The invitation component 229 can then request the account verification component 225 to verify whether the retrieved contact information indicates that the user's contacts have existing service accounts in the server computing device 205 (e.g., checking whether the email addresses in the retrieve contact information have been used to create new service accounts in the server computing device 205).

Then the invitation component 229 can request the list generation component 227 to generate a candidate list that includes the user's contacts that do not have existing accounts in the server computing device 205. The invitation component 229 then enables the user to send an invitation (e.g., via an email or SMS/MMS message) to create a new account to a predetermined number (e.g., ten) of contacts in the candidate list. The predetermined number can be determined based on availability of computing resources (e.g., connection bandwidth) or localities of the user and the invitation recipients (e.g., certain local regulations or rules may limit the number of recipients in one email).

Figure 3A:
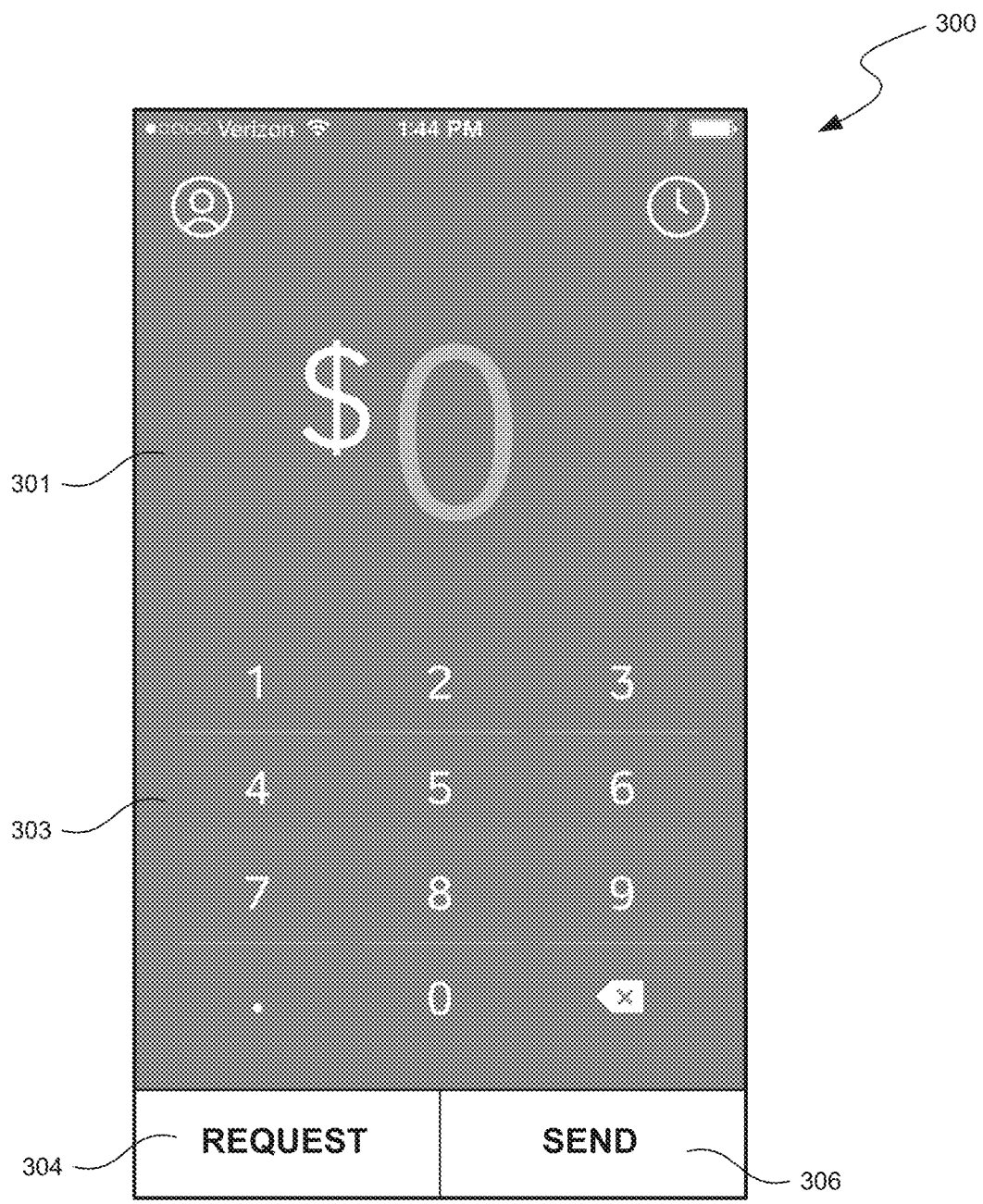
FIGS. 3A-3E are screenshots of a user interface method in accordance with various embodiments of the disclosed technology.

FIGS. 3A-3E are screenshots of a user interface 300 in accordance with various embodiments of the disclosed technology. The method enables a user to transfer an amount of currency to existing contacts by a payment application (e.g., the payment application 111 or 211). As shown in FIG. 3A, the user interface 300 can include a first region 301 and a second region 303. The first region 301 can be used to display a numerical value of currency to be sent. The second region 303 can be used to display a virtual keyboard for user inputs. The user interface 300 can include a first function button or REQUEST region 304 for enabling a user to initiate a request for sending money (or invitation) to a recipient. The user interface 300 can also include a second function button or SEND region 306 for enabling a user to confirm a payment transaction.

Figure 3B:
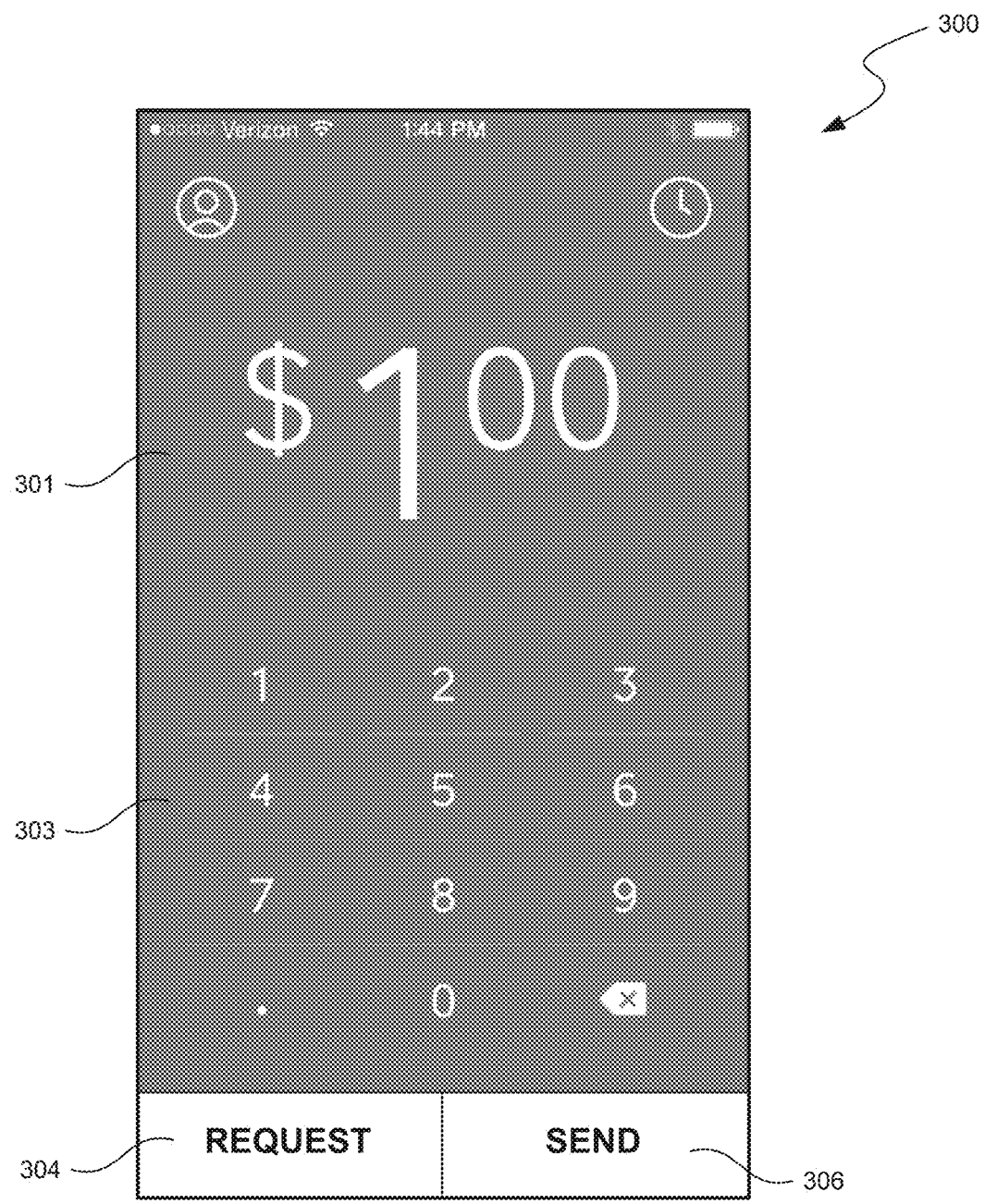
Figure 3C:
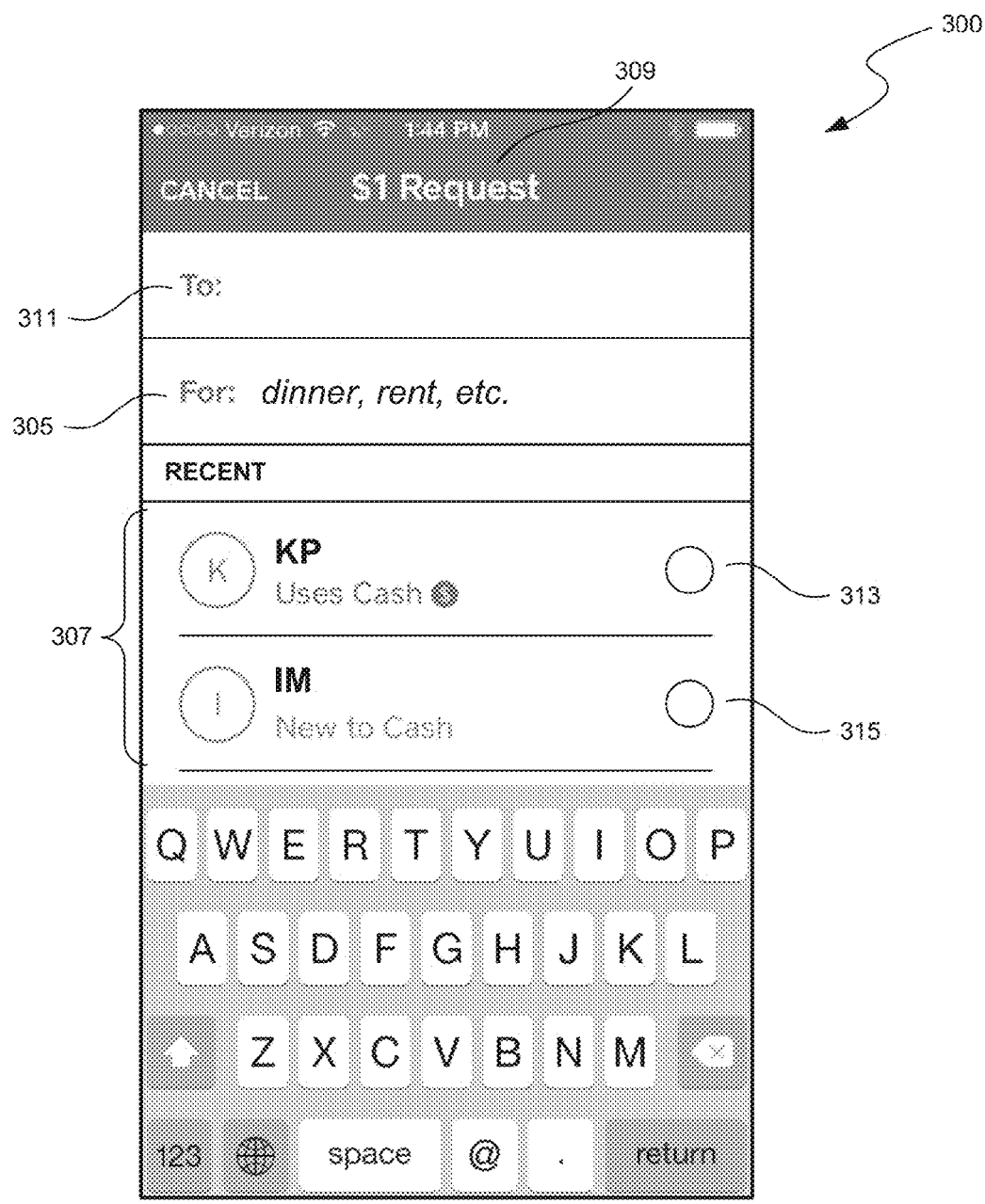

In FIG. 3B, a numerical value of currency (e.g., $1) to be sent input by a user can be displayed in the first region 301. Once the user selects the first function button (REQUEST region 304), the user interface 300 can be updated as shown in FIG. 3C. In FIG. 3C, the user interface 300 can include a third region 305, a fourth region 307, a fifth region 309, and a sixth region 311. The third region 305 enables the user to input a note regarding the payment to be made. In some embodiments, one or more note suggestions (e.g., "dinner, rent, etc." shown in FIG. 3C) can be provided in the third region 305 for user's reference. A list of contacts retrieved from a database (e.g., the database 117 or 217) of a mobile device (e.g., the client computing device 101 or 201) can be displayed in the fourth region 307. In some embodiments, the list of contacts can be verified or ranked (as discussed above). In the illustrated embodiment, two contacts (i.e., "KP" and "IM") are displayed in the fourth region 307. The fourth region 307 can indicate whether a contact has an existing service account in a PPS. The term "Uses Cash $" shown in FIG. 3C means contact KP has an existing PPS account, and the term "New to Cash" means that the contact IM has no existing PPS account. The fourth region 307 can also include check boxes 313 and 315 corresponding to the displayed contacts KP and IM, enabling the user to quickly select a contact.

Figure 3D:
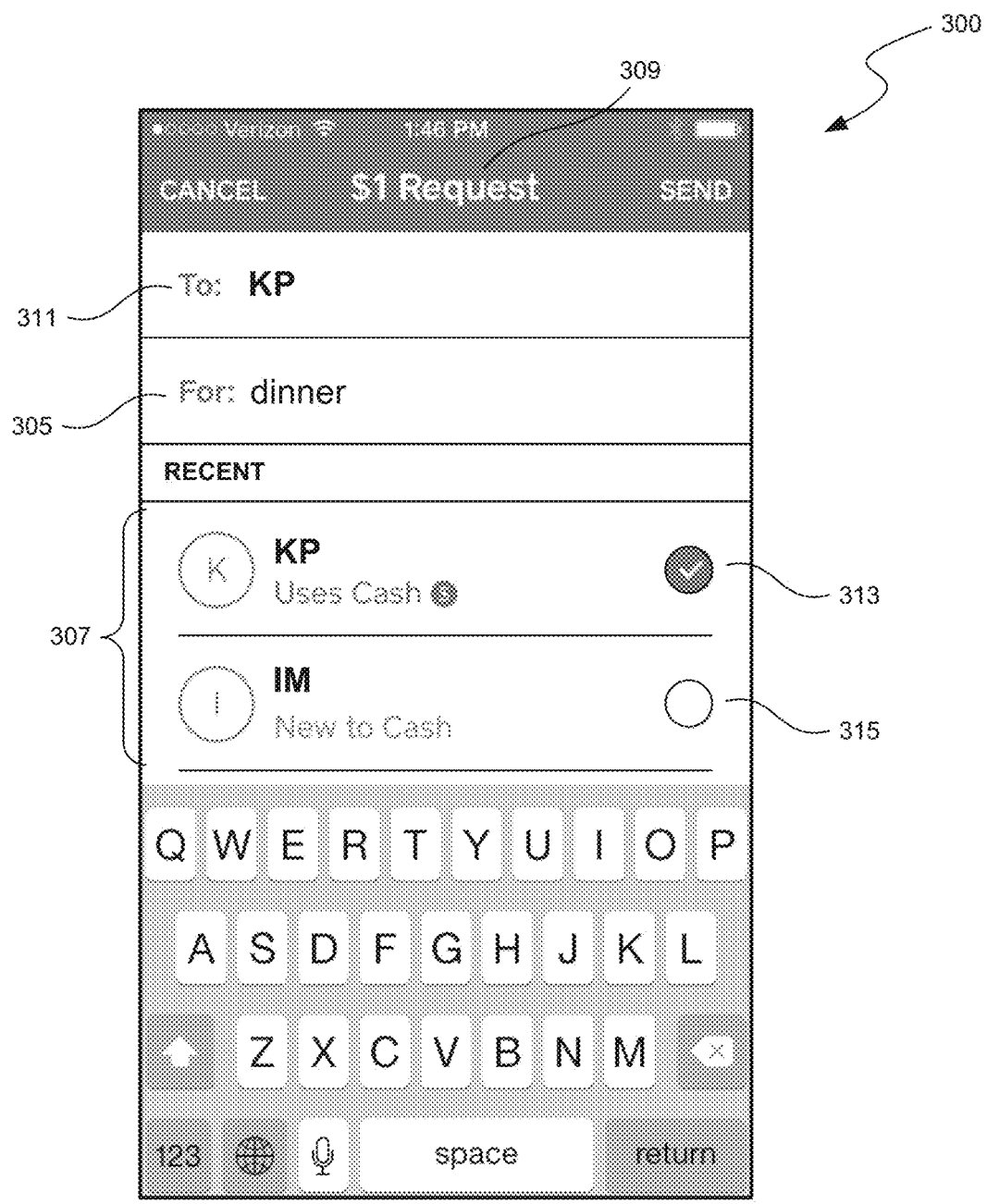
Figure 3E:
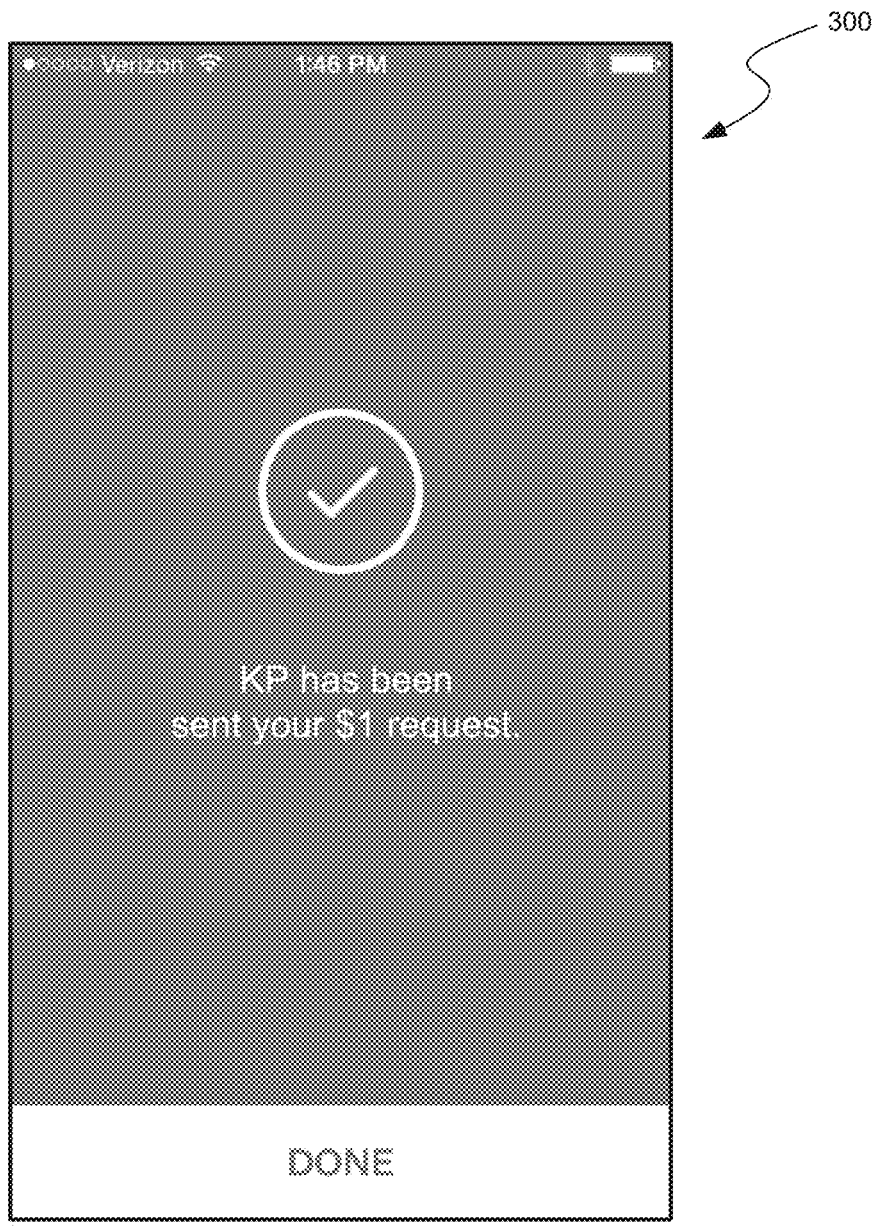

In FIG. 3C, the fifth region 309 can be used to display related information regarding the payment to be processed. This information can remind the user that the input numerical amount of currency to be sent when the selecting a contact, so as to avoid mistaken transactions. Once the user completes the selection, the selected contacts can be displayed in the sixth region 311. In FIG. 3D, contact KP has been selected by the user (e.g., by checking the check box 313) and contact KP is displayed in the sixth region 311. Once the user completes the selection, he or she can select the "SEND" button (not numbered) to have the specified amount be transferred to the selected recipient (e.g., the contact KP). Then the user interface 300 can be updated to show that the payment has been completed, as shown in FIG. 3E.

Figure 4A:
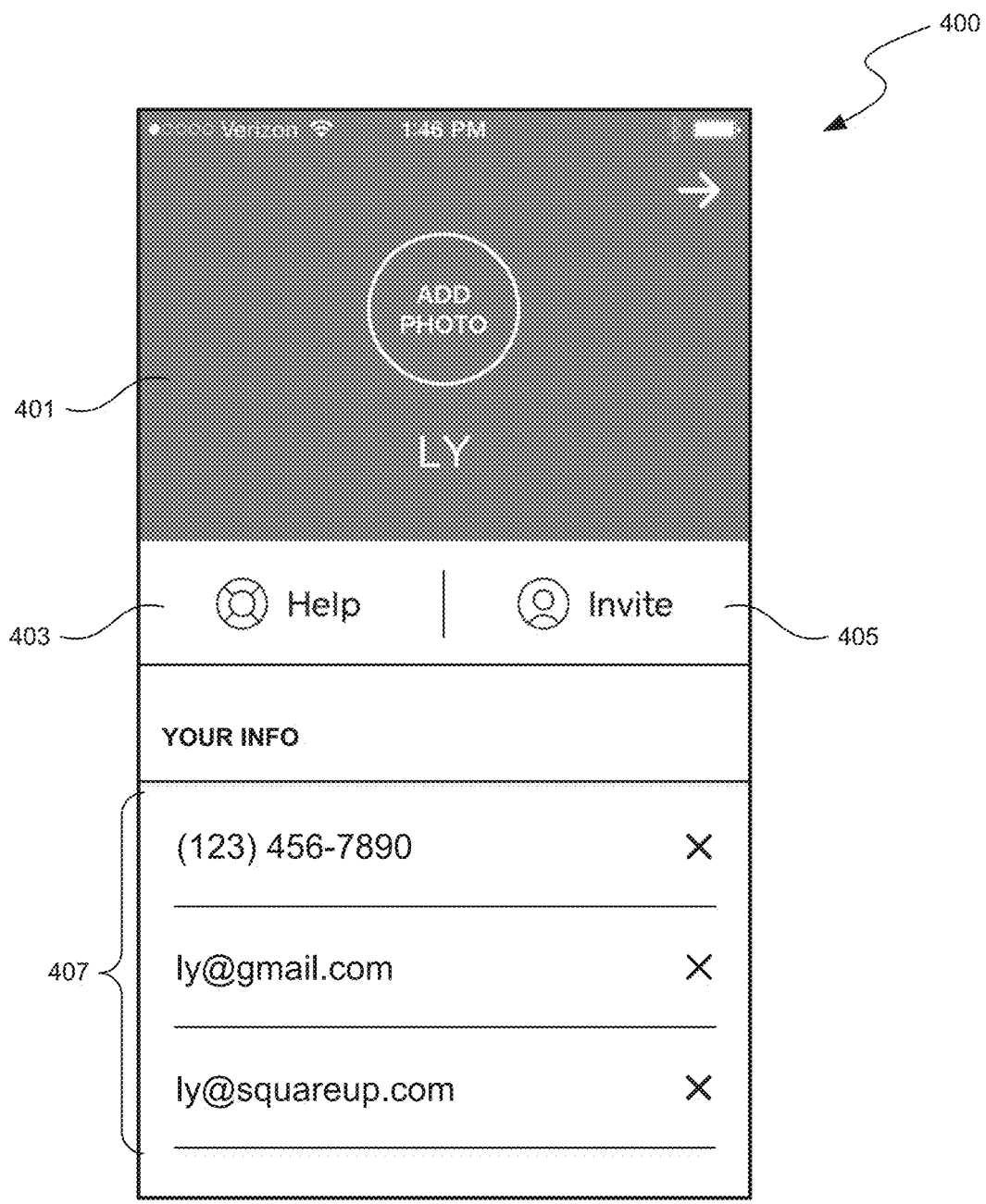
FIGS. 4A-4D are screenshots of a user interface method in accordance with various embodiments of the disclosed technology.
Figure 4B:
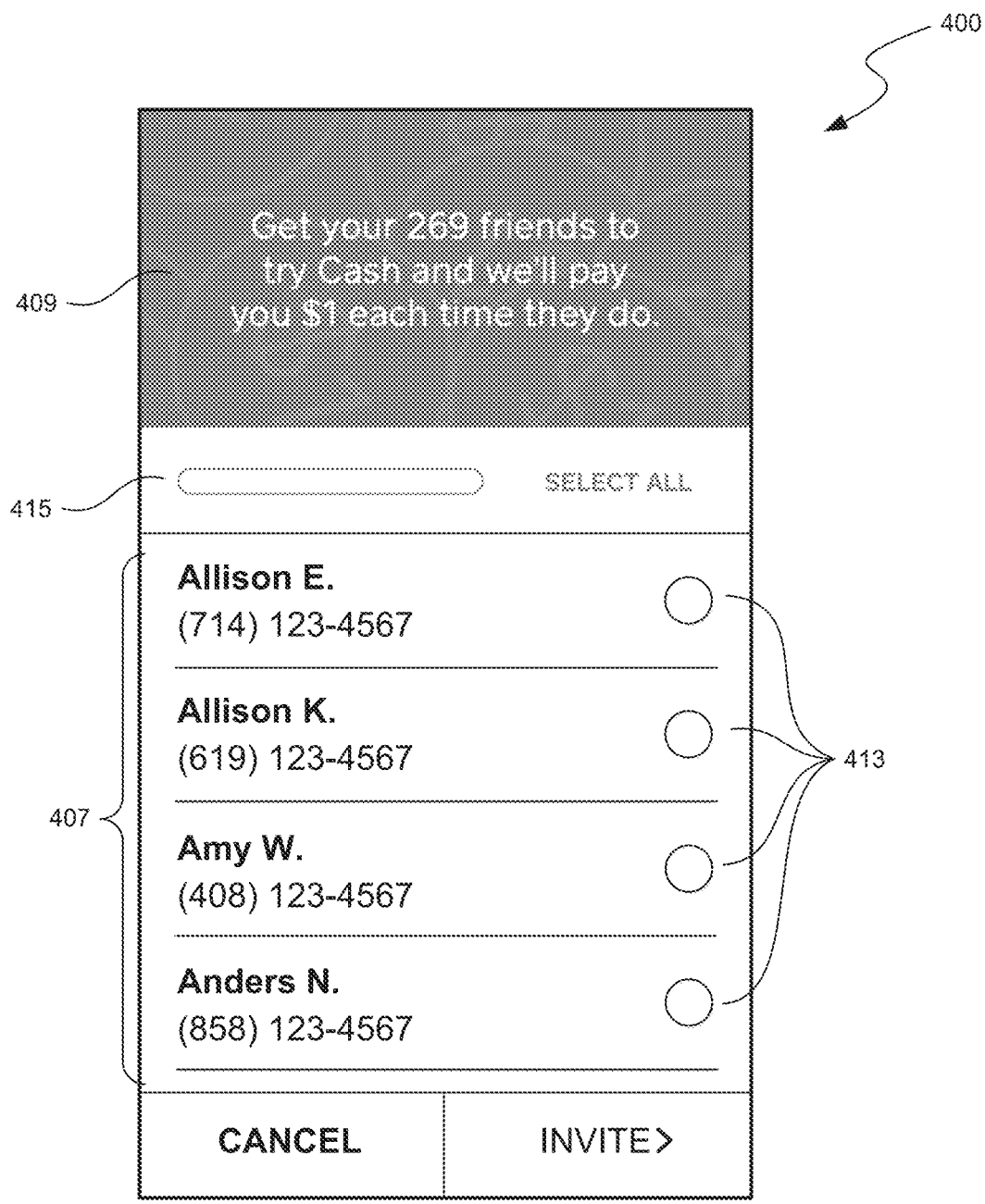

FIGS. 4A-4D are screenshots of a user interface 400 in accordance with various embodiments of the disclosed technology. The method 400 enables a user to send an invitation of creating a new service account in a PSS (e.g., the server computing device 101 or 201) associated with a payment application (e.g., the payment application 111 or 211) to existing contacts. As shown in FIG. 4A, the user interface 400 includes a first section 401, a HELP button 403, an INVITE button 405, and a second section 407. In the illustrated embodiment, the first section 401 can be used to display user's basic information (e.g., user's name or photo). The second section 407 can be used to further display the user's personal information (e.g., phone number and email addresses). When the HELP button 403 is selected, the user interface 400 can display information regarding how to operate the payment application. When the INVITE button 405 is selected, an invitation process can be initiated and the user interface 400 can be updated as shown in FIG. 4B.

In FIG. 4B, the user interface 400 can include a third section 407 and a fourth section 409. The third section 407 is used to display a list of contacts retrieved from a database (e.g., the database 117 or 217) of a mobile device (e.g., the client computing device 101 or 201). As shown in FIG. 4B, each contact can have a corresponding check box 413, enabling the user to quickly select that contact. The fourth section 409 can be used to display an incentive notice to the user. The user interface 400 can also include a SELECT-ALL button 415 enabling the user to quickly select all contacts displayed in the third section 407. Once the SELECT-ALL button 415 is selected, the user interface 400 can be updated (as shown in FIG. 4C) and the SELECT-ALL button 415 can be replaced by a DESELECT-ALL button 416, which enables the user to quickly un-select all contacts displayed in the third section 407.

Figure 4C:
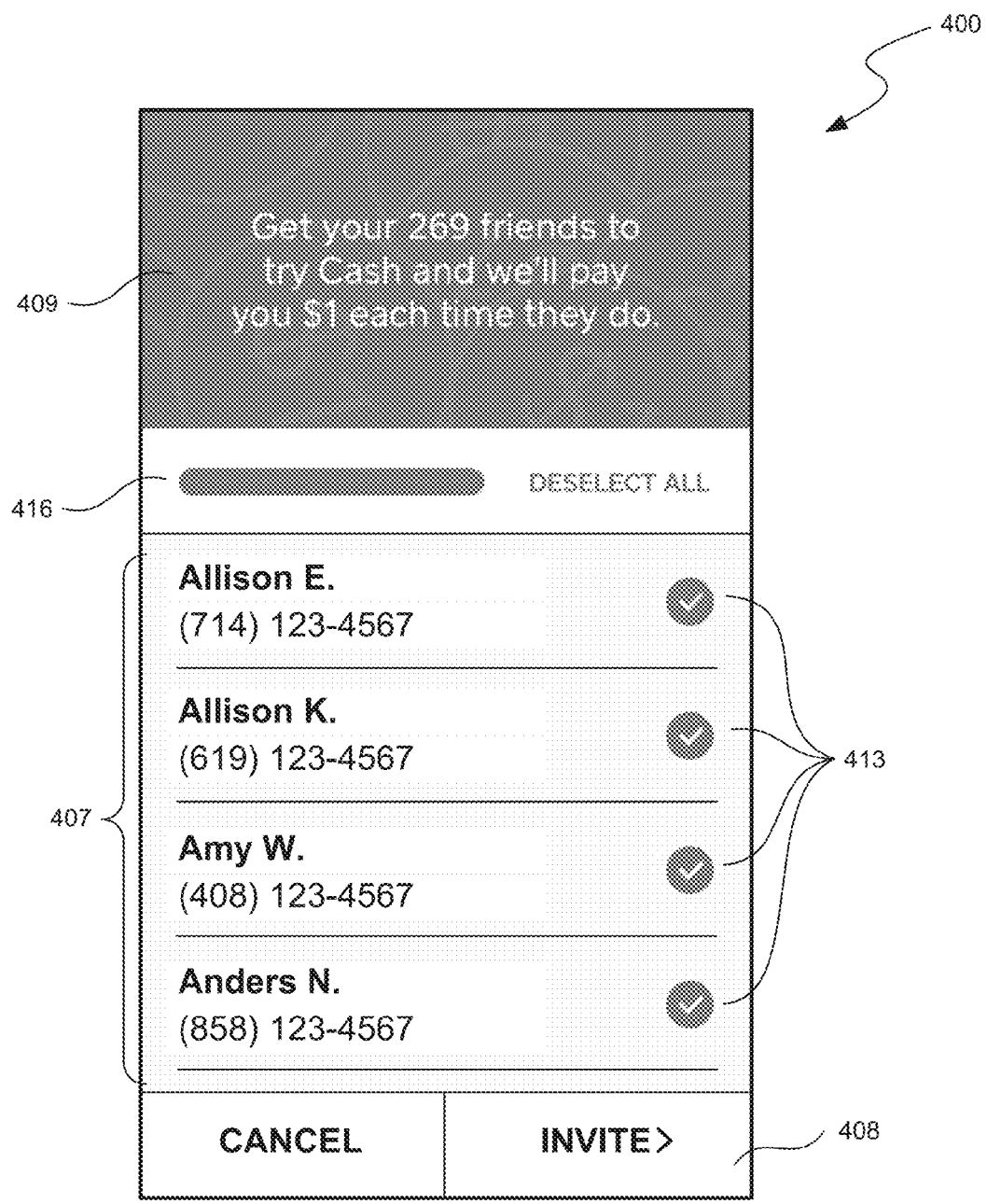
Figure 4D:
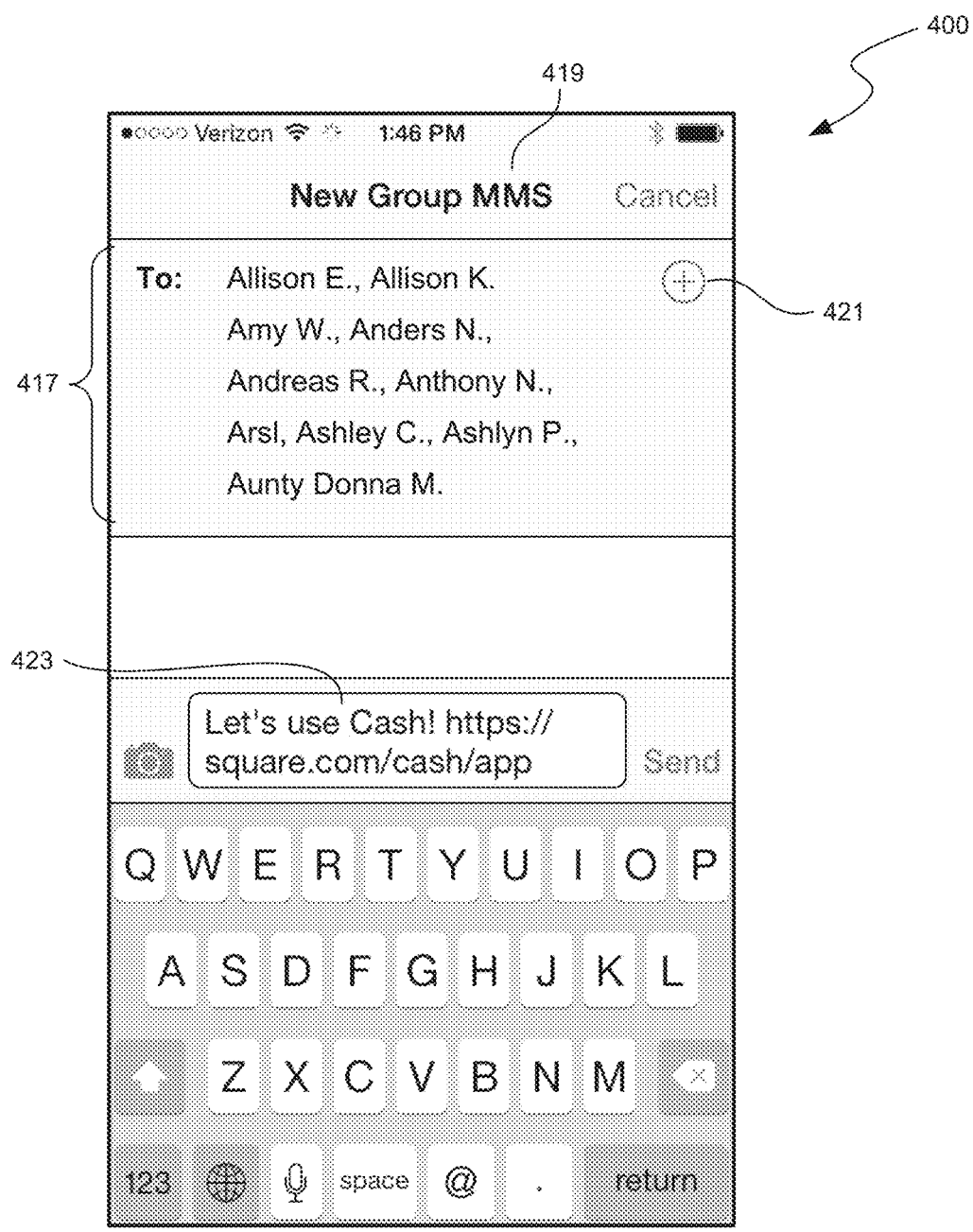

Referring to FIG. 4C, once the user completes the selection process, an "INVITE>" button 408 can be select and then the user interface 400 can be updated as shown in FIG. 4D. In FIG. 4D, the user interface 400 can include a fifth section 417, a sixth section 419, an ADD button 421, and a seventh section 423. The fifth section 417 can be used to display a list of selected invitation recipients. The sixth section 419 can be used to display a group name (or an alias) and how the invitation can be sent (e.g., via MMS). The ADD button 421 can be used to add a new recipient to the current group. The seventh section 423 can be used to display a text or link that will be shown in the invitation to be sent. The user can review and/or edit the text and/or link shown in the seventh section 423. Then the user can send the invitation to the selected recipients.

In some embodiments, the number of recipients in one message can be limited to a predetermined number (e.g., ten). In some embodiments, the predetermined number can be determined based on availability of computing resources (e.g., connection bandwidth) or localities of the user and the invitation recipients (e.g., certain local regulations or rules may limit the number of recipients in one email).

Figure 5:
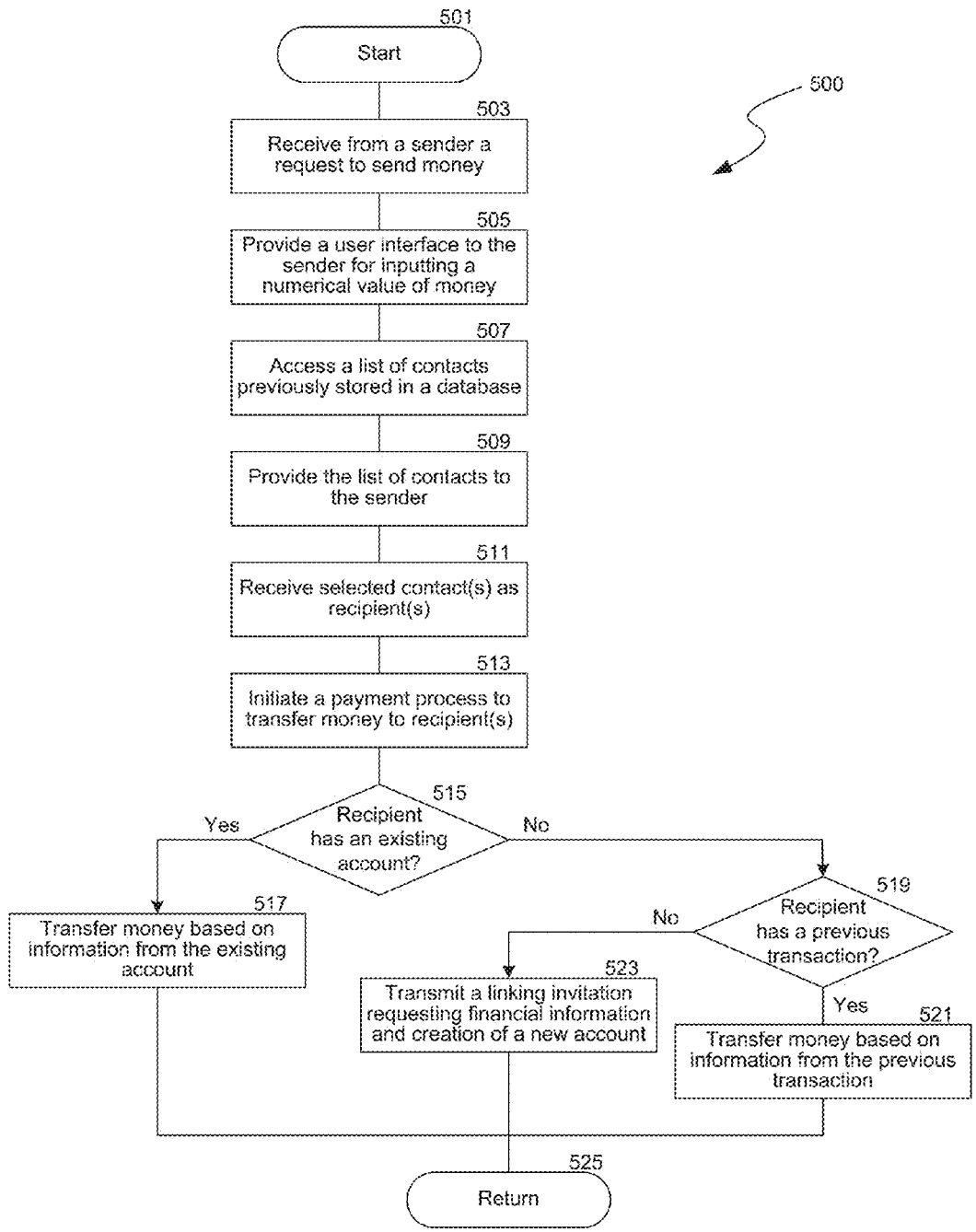
FIG. 5 is a flow chart illustrating operations of a method in accordance with various embodiments of the disclosed technology.

FIG. 5 is a flow chart illustrating operations of a method 500 in accordance with various embodiments of the disclosed technology. The method 500 can be implemented by a mobile device (e.g., the client computing device 101 or 201). The method 500 starts at block 501. The method 500 continues at block 503 by receiving from a sender (e.g., a mobile device user) a request to send money. In some embodiments, the sender can input the request through an input component (e.g., the input component 113 or 213). The method 500 can then continue at block 505 by providing a user interface to the sender for inputting a numerical value of money to be sent (e.g., the user interface 300 shown in FIG. 3A).

In response to the request, the method 500 continues at block 507 by accessing a list of contacts previously stored in a database (e.g., the database 117 or 217) of the mobile device. The list of contacts can include contact-related information such as, email addresses, phone numbers, personal websites, companies, physical addresses etc.) The accessing can be performed by the retrieving component 115 or 215. The method 500 can then continue at block 509 by providing the list of contacts to the sender by the user interface (e.g., the user interface 300 shown in FIG. 3C). The method 500 enables the sender to select one or more recipients from the provided list of contacts (e.g., as shown in FIG. 3D). Once completed, at block 511, the method 500 can receive the selected one or more contacts and identifies them as one or more recipients (e.g., as shown in FIG. 3D). The method 500 then continues at block 513 by initiating a payment process to transfer money to the identified recipients.

The method 500 continues at decision block 515 by determining whether the recipient has an existing service account in a PSS (e.g., the server computing device 105 or 205). If so, then the method 500 continues at block 517 by transferring money based on information from the existing service account (e.g., send money to a bank account associated with the existing service account). If not, then the method 500 can proceed to decision block 519 and further determines whether the recipient has a previous transaction. If the recipient does have a previous transaction (e.g., receiving money from others via the PSS), then the method 500 continues at block 521 by transferring money based on information from the previous transaction. If not, the method 500 continues at block 523 by transmitting a linking invitation requesting financial information and creation of a new account. This determination at decision blocks 515 and 519 can be performed by the account verification component 225 discussed above. The method 500 then returns at block 525.

Figure 6:
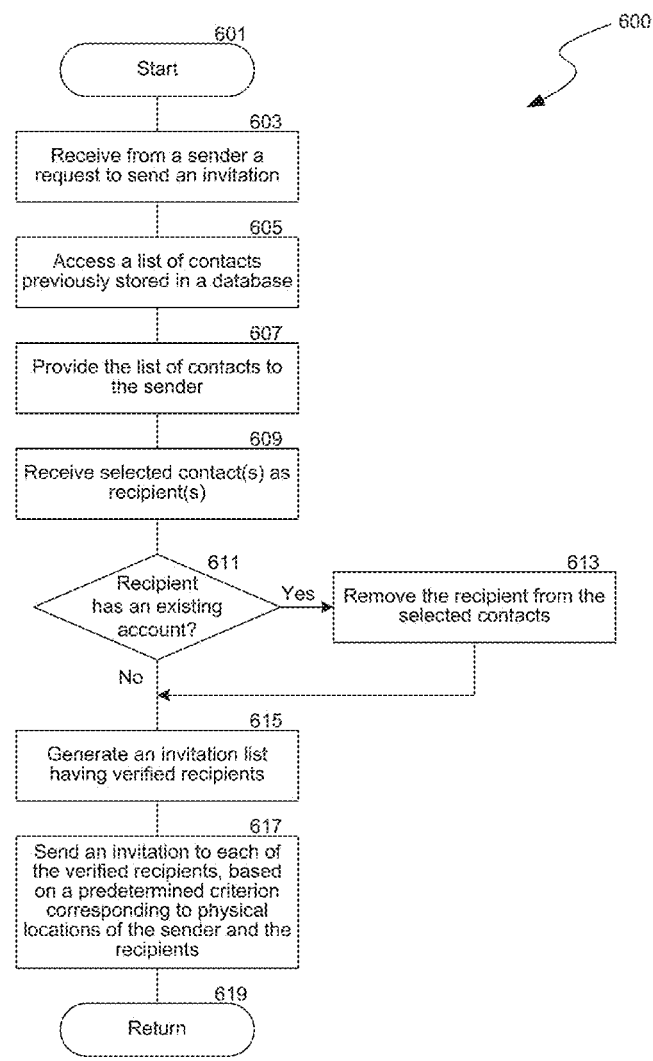
FIG. 6 is a flow chart illustrating operations of a method in accordance with various embodiments of the disclosed technology.

FIG. 6 is a flow chart illustrating operations of a method 600 in accordance with various embodiments of the disclosed technology. The method 600 can be implemented by a client computing device (e.g., the client computing device 101 or 201). The method 600 starts at block 601. The method 600 continues at block 603 by receiving from a sender a request to send an invitation (e.g., the sender selects the INVITE button 405 shown in FIG. 4A). The method 600 then continues at block 605 by accessing a list of contacts previously stored in a database (e.g., the database 117 or 217). The list of contacts can include contact-related information such as, email addresses, phone numbers, personal websites, companies, physical addresses etc.) In some embodiments, the accessing can be performed by the retrieving component 115 or 215. The method 600 continues at block 607 by providing the list of contacts to the sender (e.g., as shown in FIG. 4B). The method 600 enables the sender to select one or more recipients from the provided list of contacts (e.g., as shown in FIG. 4C). Once completed, at block 609, the method 600 can receive the selected one or more contacts and identifies them as one or more recipients (e.g., as shown in FIG. 4D). The method 600 continues at block decision 611 by determining or verifying whether the recipient has an existing service account in a PSS (e.g., the server computing device 105 or 205). If so, then the method 600 continues at block 613 by removing that recipient from the selected contacts. If not, the method 600 proceeds to block 615. The method 600 continues at block 615 by generating an invitation list having the verified recipients. In some embodiments, the invitation list can be generated by the list generation component 227 as discussed above. In some embodiments, the verified recipients can be displayed in the fifth section 417 of the user interface 400 shown in FIG. 4D.

The method 600 then continues at block 617 by sending an invitation to each of the verified recipients, based on a predetermined criterion corresponding top physical location of the sender and the recipients. In some embodiments, the predetermined criterion can be a maximum number of recipients (e.g., ten) in one outgoing message. In some embodiments, the predetermined criterion can be determined based on other factors such as availability of computing resources or related regulations. The method 600 then returns at block 619.

Figure 7:
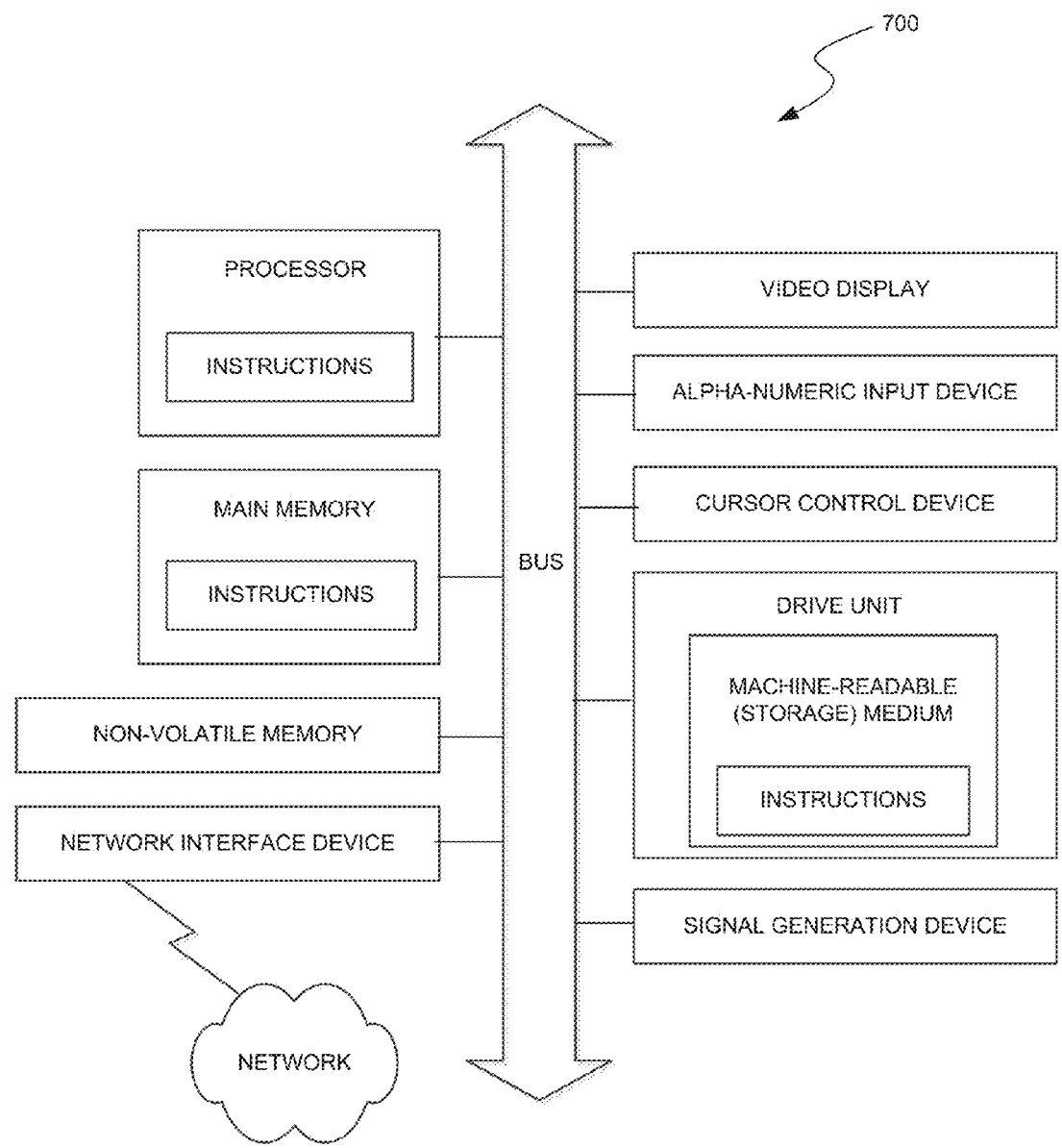
FIG. 7 is a schematic diagram illustrating a computer system with which some embodiments of the disclosed technology may be utilized.

FIG. 7 is a schematic diagram illustrating a computer system with which some embodiments of the disclosed technology may be utilized. More particularly, FIG. 7 illustrates a machine in the example form of a computer system within which a set of instructions, for causing the machine to perform any one or more of the methodologies or modules discussed herein, may be executed. In the example of FIG. 7, the computer system 700 includes a processor, memory, non-volatile memory, and an interface device. Various common components (e.g., cache memory) are omitted for illustrative simplicity. The computer system 700 is intended to illustrate a hardware device on which any of the components depicted in the examples of FIGS. 1-6 (and any other components described in this specification) can be implemented. The computer system 700 can be of any applicable known or convenient type. The components of the computer system 700 can be coupled together via a bus or through some other known or convenient device.

This disclosure contemplates the computer system 700 taking any suitable physical form. As example and not by way of limitation, the computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, one or more computer systems 700 may be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

The processor may be, for example, a conventional microprocessor such as an Intel Core microprocessor or an Intel Itanium microprocessor or a Motorola PowerPC microprocessor or a SPARC (scalable processor architecture) processor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, a random access memory (RAM), such as a dynamic RAM (DRAM) or a static RAM (SRAM). The memory can be local, remote, or distributed.

The bus also couples the processor to the non-volatile memory and drive unit. The non-volatile memory cane be a magnetic floppy or hard disk, a magnetic-optical disk, an optical disk, a flash memory such as NAND flash memory or NOR flash memory, a read-only memory (ROM) such as a CD-ROM, an erasable programmable read-only memory such as EPROM or EEPROM, a magnetic or optical card, or another form of storage for large amounts of data. Some of this data is often written, by a direct memory access process, into memory during execution of software in the computer system 700. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, storing the entire program in memory may not even be possible. Nevertheless, one should understand that for software to run, if necessary, the software is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. A person of ordinary skill will appreciate that a modem or network interface can be considered to be part of the computer system 1200. The interface can include an analog modem, ISDN (integrated services digital network) modem, cable modem, token ring interface, satellite transmission interface (e.g., "direct PC"), Wi-Fi interface, or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, this disclosure assumes that controllers of any devices not depicted in the example of FIG. 7 reside in the interface.

The computer system 700 can have one bus or multiple buses. A bus can include for example, a system bus, a Peripheral Component Interconnect (PCI) bus or PCI-Express bus, a HyperTransport or industry standard architecture (ISA) bus, a small computer system interface (SCSI) bus, a universal serial bus (USB, USB 2.0, or USB 3.0), an International Institute of Communication (I2C) bus, an Institute of Electrical and Electronics Engineers (IEEE) standard 1394 bus, also called "Firewire," a QuickPath Interconnect bus, a ThunderBolt interconnect bus, a DisplayPort interconnect bus or its companion standards Mini DisplayPort (mDP), Direct Drive Monitor (DDM), Embedded DisplayPort (eDP), Internal DisplayPort (iDP), Portable Digital Media Interface (PDMI), Wireless DisplayPort (wDP), and Mobility DisplayPort (MyDP), a High-Definition Multimedia Interface (HDMI) interconnect bus, and a Digital Visual Interface (DVI) bus.

In operation, the computer system 700 can be controlled by operating system software that includes a file management system, such as a disk operating system. The file management system is typically stored in a non-volatile memory and/or drive unit and causes the processor to execute the various acts required by the operating system to input and output data and to store data in the non-volatile memory and/or drive unit.

Although the disclosed technology has been described with reference to specific exemplary embodiments, it will be recognized that the disclosed technology is not limited to the embodiments described but can be practiced with modification and alteration within the spirit and scope of the appended claims. Accordingly, the specification and drawings are to be regarded in an illustrative sense rather than a restrictive sense.

I claim:

1. A computer-implemented method for providing a user interface to facilitate implementing a payment application, the method comprising:

providing, by a mobile device of a sender, a user interface associated with the payment application to enable the sender to input a numerical value, wherein the numerical value is associated with an amount of a payment;

receiving, by the mobile device, from the user interface, a request to initiate the payment application;

in response to receiving the request, enabling, by the mobile device, the sender to access, using the user interface, a list of contacts previously stored in a database of the mobile device, wherein accessing the list of contacts includes locating the list of contacts by a contact-list search module, identifying a type of the list of contacts by a contact-list identification module, and analyzing the list of contacts by a contact-list analysis module;

providing, by the mobile device, the list of contacts to the sender through the user interface, wherein a first contact in the list of contacts is presented to the sender in a first section of the user interface and a second contact is presented to the sender in a second section of the user interface, and wherein the first contact is associated with a first electronic device that is located within the proximity of the mobile device, and wherein the second contact is associated with a second electronic device that is located outside the proximity of the mobile device, and wherein the first section is positioned adjacent to the second section, and wherein the numerical value inputted by the sender is presented in the first section for review by the sender;

receiving, by the mobile device, a portion of the list of contacts selected by the sender through the user interface, so as to identify at least one recipient;

transmitting, by the mobile device, information associated with the recipient to a payment application server;

in an event that a first recipient has a recipient service account associated with the payment application, presenting, in the user interface, a first indication associated with information from the recipient service account;

in an event that a second recipient does not have the recipient service account associated with the payment application server, presenting, by the mobile device, in the user interface, an indication associated with a message comprising an invitation hyperlink requesting the recipient to register a new service account associated with the payment application server, wherein the invitation hyperlink is generated by a link-generation module; and while presenting the user interface corresponding to the payment application on a display associated with the mobile device indicating that a payment has been transmitted to the first recipient, instructing at the same time, by the mobile device, a background messaging process to transmit the message comprising the invitation hyperlink requesting the second recipient to register the new service account associated with the payment application.

2. The method of claim 1, further comprising:

in an event that recipient does not have the recipient service account associated with the payment application server and the recipient has been previously engaged in a previous transaction associated with the payment application, performing, by the mobile device, the payment process based on information from the previous transaction.

3. The method of claim 1, further comprising:

enabling, by the mobile device, the sender to input a note regarding the payment process based on one or more note suggestions.

4. The method of claim 1, further comprising:

determining, by the mobile device, an order of the list of contacts based on one or more ranking factors; and providing, by the mobile device, the list of contacts to the sender through the user interface includes providing the list of contacts based on the order.

5. The method of claim 4, wherein the ranking factors includes at least one of the following: (1) whether a contact of the list of contacts has been previously associated with an existing service account associated with the payment application; (2) whether the contact of the list of contacts has involved in a previous transaction associated with the payment application; (3) whether the contact of the list of contacts has been associated with the payment application; (4) a relationship between the contact of the list of contacts and the sender; and (5) whether the contact of the list of contacts is within a proximity of the sender.

6. The method of claim 1, further comprising:
identifying, by the mobile device, one or more email addresses in the list of contacts, wherein each of the email addresses corresponds to a contact of the list of contacts;
verifying, by the mobile device, whether each of the email addresses relates to an existing service account associated with the payment application;
generating, by the mobile device, a candidate list, wherein the candidate list includes one or more verified contacts, wherein the verified contacts do not have existing service accounts associated with the payment application;
generating, by the mobile device, an invitation list by enabling the sender to select a specified number of invitees from the candidate list;
sending, by the mobile device, an invitation to each of the invitees from the sender, wherein the invitation includes a set of information regarding registering a new account associated with the payment application.

7. A computer-implemented method for providing a user interface to facilitate implementing a payment application, the method comprising:
providing, by a mobile device of a sender, a user interface associated with the payment application to enable the sender to input a numerical value;
receiving, by the mobile device, a request to implement the payment application from the user interface;
in response to receiving the request, enabling, by the mobile device, the sender to access, through the interface, a list of contacts previously stored in a database of the mobile device, wherein accessing the list of contacts includes locating the list of contacts by a contact-list search module, identifying a type of the list of contacts by a contact-list identification module, and analyzing the list of contacts by a contact-list analysis module;
providing, by the mobile device, the list of contacts to the sender through the user interface, wherein a first contact in the list of contacts is presented to the sender in a first section of the user interface and a second contact is presented to the sender in a second section of the user interface, and wherein the first contact is associated with a first electronic device that is located within the proximity of the mobile device, and wherein the second contact is associated with a second electronic device that is located outside the proximity of the mobile device, and wherein the first section is positioned in parallel and adjacent to the second section, and wherein the numerical value is presented in the first section so as to remind the sender;
receiving, by the mobile device, a portion of the list of contacts selected by the sender through the user interface, so as to identify at least one recipient;
transmitting, by the mobile device, information associated with the recipient to the payment application; and
while presenting the user interface corresponding to the payment application on a display associated with the mobile device indicating that a payment has been transmitted to a first recipient with a recipient service account associated with the payment application, instructing at the same time, by the mobile device, a background messaging process to transmit a message to a second recipient comprising an invitation hyperlink requesting the recipient to register a new service account, wherein the second recipient is not associated with recipient service account associated with the payment application.

8. The method of claim 7, further comprising:
in an event that the recipient has been previously engaged in a previous transaction associated with a server associated with the payment application, performing, by the mobile device, the payment process based on information from the previous transaction.

9. The method of claim 7, further comprising:
in an event that the recipient has a recipient service account associated with a server associated with the payment application, performing, by the mobile device, the payment process based on information from the recipient service account.

10. The method of claim 7, further comprising:
in an event that the recipient does not have a recipient service account associated with a server associated with the payment application, performing, by the mobile device, the payment process by transmitting a linking invitation requesting the recipient to submit recipient financial account information and to register a new service account associated with the payment application, wherein the linking invitation is generated by a link-generation module.

11. The method of claim 7, further comprising:
in an event that the sender does not have a sender service account associated with a server associated with the payment application, performing, by the mobile device, the payment process by transmitting a linking invitation requesting the sender to submit sender financial account information and to register a new service account associated with the payment application, wherein the linking invitation is generated by a link-generation module.

12. The method of claim 7, wherein the payment application completes the payment process without requiring the sender to login on a payment service server associated with the payment application.

13. The method of claim 7, wherein the payment application completes the payment process without requiring the recipient to login on a payment service server associated with the payment application.

14. The method of claim 7, wherein the payment application completes the payment process without requiring the sender to register an account of a payment service server associated with the payment application.

15. The method of claim 7, wherein the payment application completes the payment process without requiring the recipient to register an account of a payment service server associated with the payment application.

16. The method of claim 7, further comprising enabling, by the mobile device, the sender to input a note regarding the payment process based on one or more note suggestions.

17. The method of claim 7, further comprising determining, by the mobile device, an order of the list of contacts based on one or more ranking factors.

18. The method of claim 17, wherein providing the list of contacts to the sender through interface includes providing, by the mobile device, the list of contacts based on the order.

19. The method of claim 17, wherein the ranking factors includes at least one of the following: (1) whether a contact of the list of contacts has been previously associated with an existing service account associated with the payment application; (2) whether the contact of the list of contacts has involved in a previous transaction associated with the payment application; (3) whether the contact of the list of contacts has been associated with the payment application; (4) a relationship between the contact of the list of contacts and the sender; and (5) whether the contact of the list of contacts is within a proximity of the sender.

20. The method of claim 11, further comprising:
identifying, by the mobile device, one or more email addresses in the list of contacts, wherein each of the email addresses corresponds to a contact of the list of contacts;
verifying, by the mobile device, whether each of the email addresses relates to an existing service account associated with the payment application;
generating, by the mobile device, a candidate list, wherein the candidate list includes one or more verified contacts, wherein the verified contacts do not have existing service accounts associated with the payment application;
generating, by the mobile device, an invitation list by enabling the sender to select a specified number of invitees from the candidate list;
sending, by the mobile device, an invitation to each of the invitees from the sender, wherein the invitation includes a set of information regarding registering a new account associated with the payment application.

21. A system, comprising:
a client computing device having:
a processor and memory;
a client database configured to store a set of contact information, wherein the set of contact information includes multiple contacts and multiple corresponding email addresses;
an input component configured to receive a request to implement a payment application;
a display component configured to provide a user interface associated with the payment application to enable the sender to input a numerical value;
a retrieving component configured to retrieve a list of contacts by accessing the set of contact information stored in the client database, wherein accessing the set of contacts includes locating the set of contacts by a contact-list search module, identifying a type of the list of contacts by a contact-list identification module, and analyzing the set of contacts by a contact-list analysis module;
wherein the list of contacts is provided to the sender through the user interface, wherein a first contact in the list of contacts is presented to the sender in a first section of the user interface and a second contact is presented to the sender in a second section of the user interface, and wherein the first contact is associated with a first electronic device that is located within the proximity of the mobile device, and wherein the second contact is associated with a second electronic device that is located outside the proximity of the mobile device, and wherein the first section is positioned in parallel and adjacent to the second section, and wherein the numerical value is presented in the first section so as to remind the sender;
wherein a portion of the list of contacts is selected by the sender through the user interface; and
a messaging component to transmit a message comprising an invitation hyperlink requesting a first recipient to register a service account associated with the payment application in the background at the same time that the user interface corresponding to the payment application is being presented on a display associated with the mobile device, wherein the user interface presented is indicating that a payment has been transmitted to a second recipient.

22. The system of claim 21, further comprising:
a server computing device having a server database storing multiple existing service accounts associated with the payment application;
wherein the client computing device further includes:
an account verification component configured to verify whether each of the email addresses relates to one of the existing service accounts;
a list generation component configured to generate a candidate list having one or more verified contacts, wherein the verified contacts do not have existing service accounts associated with the payment application, wherein the list generation component is configured to generate an invitation list by enabling the sender to select a specified number of invitees from the candidate list;
an invitation component configured to send an invitation to each of the invitees from the sender, wherein the invitation includes a set of information regarding registering a new account associated with the payment application.

23. The system of claim 21, wherein in an event that the recipient has been previously engaged in a previous transaction associated with the payment application, the payment application performs the payment process based on information from the previous transaction.

24. The system of claim 21, wherein in an event that the recipient has an existing service account associated with the payment application, the payment application performs the payment process based on information from the existing service account.

25. The system of claim 21, wherein in an event that the recipient does not have an existing service account associated with the payment application, the payment application performs the payment process by transmitting a linking invitation requesting the recipient to submit recipient financial account information and to register a new service account associated with the payment application, wherein the linking invitation is generated by a link-generation module.

26. The system of claim 21, wherein in an event that the sender does not have an existing service account associated with the payment application, the payment application performs the payment process by transmitting a linking invitation requesting the sender to submit sender financial account information and to register a new service account associated with the payment application, wherein the linking invitation is generated by a link-generation module.

27. The system of claim 21, wherein the payment application completes the payment process without requiring the sender to login on a payment service server associated with the payment application.

28. The system of claim 21, wherein the payment application completes the payment process without requiring the recipient to login on a payment service server associated with the payment application.

29. The system of claim 21, wherein the payment application completes the payment process without requiring the sender to register an account of a payment service server associated with the payment application.

30. The system of claim 21, wherein the payment application completes the payment process without requiring the recipient to register an account in a payment service server associated with the payment application.

31. The system of claim 21, wherein the payment application enables the sender to input a note regarding the payment process based on one or more note suggestions.

32. The system of claim 21, wherein the payment application determines an order of the list of contacts based on one or more ranking factors.

33. The system of claim 32, wherein the payment application provides the list of contacts to the sender based on the order.

34. The system of claim 32, wherein the ranking factors includes at least one of the following: (1) whether a contact of the list of contacts has been previously associated with an existing service account associated with the payment application; (2) whether the contact of the list of contacts has involved in a previous transaction associated with the payment application; (3) whether the contact of the list of contacts has been associated with the payment application; (4) a relationship between the contact of the list of contacts and the sender; and (5) whether the contact of the list of contacts is within a proximity of the sender.

* * * * *